United States Patent [19]
Uhrig et al.

[11] Patent Number: 5,194,665
[45] Date of Patent: Mar. 16, 1993

[54] SURFACTANTS BASED ON HYDROXYNAPHTHOIC ESTERS AND PREPARATION AND USE THEREOF

[75] Inventors: Heinz Uhrig, Steinbach; Erich Ackermann, Kelkheim; Alexander Sieber, Frankfurt am Main, all of Fed. Rep. of Germany

[73] Assignee: Hoechst AG, Frankfurt am Main, Fed. Rep. of Germany

[21] Appl. No.: 581,515

[22] Filed: Sep. 11, 1990

Related U.S. Application Data

[62] Division of Ser. No. 372,311, Jun. 28, 1989, Pat. No. 4,980,425.

[51] Int. Cl.$^5$ ............... C07C 69/76; C08F 232/00
[52] U.S. Cl. .................... 560/56; 525/450; 252/352
[58] Field of Search ............ 560/56; 525/450; 252/325

[56] References Cited

U.S. PATENT DOCUMENTS 4,403,077 6/1983 Uhrig et al. ............... 525/502
4,403,079 6/1983 Uhrig et al. ............... 525/507

FOREIGN PATENT DOCUMENTS 0065751 1/1982 European Pat. Off. .
0058384 8/1982 European Pat. Off. .
399279 11/1990 European Pat. Off. .
3246346 10/1988 Japan .
1121247 5/1989 Japan .
1121248 5/1989 Japan .
87/06577 11/1987 PCT Int'l Appl. .

*Primary Examiner*—Paul J. Killos
*Attorney, Agent, or Firm*—Connolly & Hutz

[57] ABSTRACT

The ever increasing demands on dispersants, emulsifiers and formulation aids, in particular in the preparation of azo dyes and pigments and in the preparation of dye and pigment dispersions, made it necessary to develop novel surface-active compounds.

According to the invention, it has been possible by esterification of hydroxynaphthalenecarboxylic acids (on the carboxyl) with fatty alcohols or preferably with alkoxylates of fatty acids, resin acids or alkylphenols, condensation of the resulting esterification products with aldehydes to give novolak resins with subsequent alkoxylation and esterification of terminal OH groups with resin acids, fatty acids, aromatic carboxylic acids and hydroxylcarboxylic acids with or without reaction with phthalic anhydride or maleic anhydride and sulfite to develop novel polyfunctional surfactant structures which are very highly suitable for a wide range of applications in dispersion and emulsification, in particular in the preparation and formulation of azo pigments.

17 Claims, No Drawings

SURFACTANTS BASED ON HYDROXYNAPHTHOIC ESTERS AND PREPARATION AND USE THEREOF

This is a division of copending U.S. application Ser. No. 07/372,311, filed on Jun. 28, 1989, now U.S. Pat. No. 4,980,425.

The present invention relates to the field of surfactants. The invention provides compounds of the general formula (I)

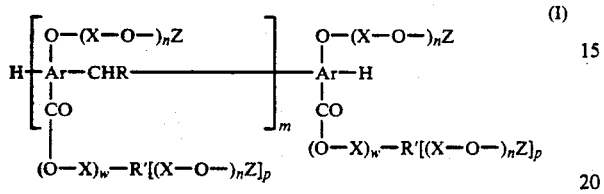

where
- Ar is naphthalene,
- each X is independently of the others 1,2-ethylene or 1,2-propylene, preferably 1,2-ethylene, or a combination thereof,
- n and w are each independently of the others a number from 0 to 200 with at least one of the numbers n and w being different from 0,
- each Z is independently of the other Z radicals a hydrogen atom or an anionic, nonionic or cationic aliphatic, alicyclic, aromatic, araliphatic or aralicyclic acyl radical of 1 to 60 carbon atoms or a group of the formula $-SO_3M$, where M is a cation,
- each R is independently of the other R radicals a hydrogen atom or an alkyl radical of 1 to 9 carbon atoms,
- each R' is independently of the other R, radicals an amine or amide nitrogen atom or an aliphatic, alicyclic or aromatic radical or a combination of two or more such hydrocarbon radicals, the radical R' having a total of 1 to 60 carbon atoms and being bonded to the adjacent X radicals and, if w=0, to the CO group either via an oxygen atom or via an amine or amide nitrogen atom,
- each p is independently of the other p indices a number from 0 to 6 and
- m is a number from 0 to 9.

The novel surfactants are primarily those compounds of the abovementioned formula (I) where the total number (n +w) of all alkyleneoxy units per naphthalene Ar is from 2 to 150, preferably from 6 to 150.

Of substantial interest are compounds of the formula (I) according to the invention where
- Ar is naphthalene,
- each Z is independently of the others a hydrogen atom or an anionic or nonionic aliphatic, alicyclic, aromatic or araliphatic acyl radical of in total 1 to 40 carbon atoms, in particular 4 to 20 carbon atoms, or a group of the formula $-SO_3M$, where M is a cation,
- R is a hydrogen atom or a $C_1-C_6$-alkyl radical, preferably hydrogen or $C_1-C_4$-alkyl, such as methyl, ethyl, propyl or butyl, in particular hydrogen,
- each R' is independently of the others an aliphatic, alicyclic, aromatic, araliphatic or aralicyclic radical of 1 to 40 carbon atoms which is bonded to the adjacent X radicals and, if w=0, to the CO group via an oxygen or amine or amide nitrogen atom,
- each p is independently of the others from 0 to 3, in particular 0 or 1,
- m is from 0 to 4,
- X is 1,2-ethylene or 1,2-propylene, preferably 1,2-ethylene and less than 50% 1,2-propylene, and
- each n is independently of the others from 1 to 100.

Preferred compounds of the formula (I) according to the invention contain at least one nonionic or anionic acyl radical Z from the group consisting of the following structures:

$-CO-R^1$, $-CO-CH=CH-COOM$, $-CO-CH_2-CH(SO_3M)-COOM$, $-CO-C_6H_4-COOM$, $-CO-R^*[-COOM]_k$ and $-SO_3M$, where in the foregoing formulae
- R' is a saturated or unsaturated, straight-chain or branched hydrocarbon radical of 1 to 19 carbon atoms which is unsubstituted or substituted by a hydroxyl group, preferably a straight-chain, saturated or unsaturated $C_7-C_{19}$-alkyl radical of a fatty or hydroxy-fatty acid of 8 to 2? carbon atoms, or is a phenyl or naphthyl radical which is unsubstituted or monosubstituted, disubstituted or trisubstituted by radicals from the group consisting of $C_1-C_{14}$-alkyl, benzyl, phenylethyl, $C_1-C_4$-alkoxy, $C_1-C_4$-alkanoyl, carbamoyl, phenyl, mono- or di-$(C_1-C_4$-alkyl)aminocarbonyl and hydroxyl, or is a polycyclic hydrocarbon radical of an unmodified or modified resin acid, preferably of a resin acid of the rosin type,
- $R^*[-COOM]_k-CO-$ is an acyl radical of a dimerized or trimerized fatty acid based on $C_{12}-C_{20}$-fatty acids, where $R^*$ is the hydrocarbon part of the acyl radical and k is accordingly either 1 or 2, and
- M is in each case a cation, preferably $H^+$ or an alkali metal cation or one equivalent of an alkaline earth metal cation or ammonium or an ammonium ion which is substituted by at least one radical from the group consisting of $C_1-C_4$-alkyl and $C_1-C_4$-hydroxyalkyl, or an ammonium ion which is obtainable by addition of 1 to 150 mole equivalents of ethylene oxide or propylene oxide or of a mixture thereof onto ammonia or onto an amine corresponding to one of the aforementioned ammonium ions.

In this connection, there may be mentioned in particular compounds of the formula (I) which have at least one radical $-R'[X-O-)_nZ]_p$ from the group consisting of the following structures:

$-O-CO-R^1$, $-O-R^2$, $-NR^3-R^2$, $-NR^3-CO-R^1$, $-O-CH_2-[CHOR^3-]_qCH_2-O-CO-R^1$,

—O—CH$_2$—[CHOR$^3$—]$_q$CH$_2$—O—R$^2$,

—O—CH$_2$—C[CH$_2$OR$^3$]$_2$—CH$_2$—O—CO—R$^1$,

—(NR$^3$—C$_i$H$_{2i}$—)$_r$NR$^3$—R$^2$,

—NR$^3$—(X—O—)$_n$CO—R$^1$,

—O—CO—R*[—CO(X—O—)$_n$Z]$_k$ and

—OR$^4$ where in the above formulae X, Z, n, R$^1$, R* and k have the abovementioned meanings and R$^2$ is a saturated or unsaturated, straight-chain or branched hydrocarbon radical of 1 to 20 carbon atoms, preferably a straight-chain, saturated or unsaturated C$_8$–C$_{20}$-alkyl radical based on a fatty alcohol, R$^3$ is hydrogen, C$_1$–C$_4$-alkyl or a group of the formula (X—O)$_n$Z, where X, Z and n have the abovementioned meanings, R$^4$ is phenyl or naphthyl which are each unsubstituted or monosubstituted, disubstituted or trisubstituted by radicals from the group consisting of C$_1$–C$_{14}$-alkyl, q is from 1 to 4, preferably 1, r is from 1 to 6, preferably 1 or 2, and i is from 1 to 6, preferably 3.

The present invention regards as particularly useful compounds of the type of formula (I) where Z comes from the group consisting of the following structures: H, —CO—CH=CH—COOM, —CO—CH$_2$—CH(SO$_3$M)—COOM, —CO—C$_6$H$_4$-COOM, —CO—C$_6$H$_5$ and the acyl radical of dehydroabietic acid, at least one radical Z being different from H, and the radicals —R'[X—O—)$_n$Z]$_p$ being selected from the group consisting of the following structures:

—O—CO—R$^1$,

—O—R$^2$,

—NR$^3$—R$^2$,

—NR$^3$—CH$_2$CH$_2$—O—CO—R$^1$,

—CH$_2$—CH[O—(X—O—)$_n$Z]-CH$_2$—O—CO—R$^1$ and

—NR$^3$—CH$_2$CH$_2$CH$_2$—NR$^3$—R$^2$ where in the above formulae R$^1$, R$^2$, X and Z have the abovementioned meanings, and R$^3$ is hydrogen or (X—O—)$_n$Z, n is from 2 to 50, in particular from 2 to 20, w is from 0 to 100, in particular from 1 to 50, and M is a cation from the group consisting of H$^+$, an alkali metal cation, one equivalent of an alkaline earth metal cation, ammonium, and an ammonium group which is substituted by lower alkyl and is obtained by addition of up to 100 mole equivalents of ethylene oxide or propylene oxide or a mixture thereof onto ammonia or lower alkylamines.

Practical importance in respect of the application properties of interest here has been attained by those compounds according to the invention in which each naphthalene nucleus Ar is bonded to a hydrophobic radical via its acyl or hydroxyl group and to a hydrophilic radical via the remaining hydroxyl or acyl group.

Of the compounds according to the invention which are novolaks and in which m is from 1 to 9, preferably from 1 to 4, and in particular 1 or 2, those where p is zero are preferred.

The present invention also provides a process for preparing the compounds of the general formula (I) according to the invention, which comprises esterifying hydroxynaphthalenecarboxylic acids of the formula HO—Ar—COOH by treatment with compounds of the formula (II)

$$H(-O-X)_w-R'[(X-O-)_nZ]_p \quad (II),$$

where Ar, X, R', Z, w, n and p have the meanings mentioned in the elucidation of the formula (I) and where preferably Z is hydrogen or p is 0, at the carboxyl group of the hydroxynaphthalenecarboxylic acids, condensing the resulting esterification product without further or intermediary isolation either with an aldehyde of the formula RCHO, where R is as defined above, or with a reactive compound which liberates a corresponding aldehyde to form a novolak resin having 2 to 10 nuclei in the molecule, alkoxylating this novolak resin, or the previously mentioned esterification product, with ethylene oxide or propylene oxide or a mixture thereof to introduce polyglycol ether chains at the hydroxyl groups which are bonded to naphthalene nuclei and possibly at any further hydroxyl groups present or at amino groups derived from the compound of the formula (II) which have reactive hydrogen, and finally leaving the terminal hydroxyl groups of the alkoxylate obtained unmodified or reacting some or all of them with acids of the formula Z-OH, where Z is as defined above, or with reactive derivatives thereof in one or more stages.

Suitable starting compounds for preparing the novel compounds of the formula (I) are hydroxynaphthalenecarboxylic acids such as 2-hydroxy-1-naphthoic acid, 1-hydroxy-2-naphthoic acid, 3-hydroxy-1-naphthoic acid, 3-hydroxy-2-naphthoic acid, 4-hydroxy-2-naphthoic acid, 4-hydroxy-1-naphthoic acid, 5-hydroxy-1-naphthoic acid, 5-hydroxy-2-naphthoic acid, 6-hydroxy-2-naphthoic acid, 6-hydroxy-1-naphthoic acid, 7-hydroxy-2-naphthoic acid and 7-hydroxy-1-naphthoic acid, 8-hydroxy-2-naphthoic acid and 8-hydroxy-1-naphthoic acid, preferably 3-hydroxy-2-naphthoic acid and 6-hydroxy-2-naphthoic acid.

Suitable compounds of the formula (II) are for example:

a) saturated or unsaturated, straight-chain or branched alcohols of 1 to 30 carbon atoms, such as methanol, ethanol, propanol, isopropanol, n-butanol, 2-butanol, isobutanol, t-butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, 2-methylpentanol, 2-ethylhexanol, 2-propylheptanol, 2-butyloctanol, 2-pentylnonanol, 2-hexyldecanol, 2-heptylundecanol, 2-octyldodecanol, 2-nonyltridecanol, 2-decyltetradecanol, 3-undecylpentadecanol, 2-dodecylhexadecanol, 10-undecenol, 9c-octadecenol, 9t-octadecenol, 9c,12c-octadecadienol, 9c,12c,15c-octadecatrienol, 9c-eicosenol, 5,8,11,14-eicosatetraenol, 13c-docosenol and 13t-docosenol, preferably commercial saturated or unsaturated fatty alcohols, such as hexyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, eicosyl alcohol, heneicosyl alcohol, docosyl alcohol, elaidyl alcohol, oleyl alcohol, eicosenyl alcohol and erucyl alcohol, preferably the last even-numbered fatty alcohols of 12 to 18 carbon atoms;

b) monoamines or polyamines having saturated or unsaturated alkyl radicals of 1 to 30 carbon atoms, for example the amines corresponding to the alcohols mentioned under a) which are formed by replacing the hydroxyl group for an amino group, preferably octylamine, decylamine, dodecylamine, tetradecylamine, hexadecylamine, octadecylamine, oleylamine, stearylamine and tallow fatty amine, but also polyamines such as tallow fatty propylenediamine and N,N-bis(aminopropyl) tallow fatty amine;

c) resin alcohols or resin amines, preferably commercial resin compounds obtained on the basis of unmodified or modified natural resins, for example abietyl alcohol, dihydroabietyl alcohol, dehydroabietyl alcohol and also abietylamine or dehydroabietylamine;

d) alkoxylation products as obtained on addition of ethylene oxide and/or propylene oxide onto the compounds mentioned under a), b) or c), preferably alkoxylation products with the fatty alcohols, fatty amines, resin alcohols or resin amines mentioned as preferred under a) to c);

e) alkoxylation products as obtained by addition of ethylene oxide and/or propylene oxide onto aliphatic, alicyclic, aromatic, araliphatic or aralicyclic carboxylic acids, for example alkoxylation products on alkanoic acids such as formic acid, acetic acid, propionic acid, butyric acid, valeric acid, caproic acid, heptanoic acid, octanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, 10-undecenoic acid, lauroleic acid, myristoleic acid, palmitoleic acid, 6c- and 6t-octadecenoic acid, elaidic acid, oleic acid, linoleic acid, linolenic acid, ricinoleic acid or ricinenic acid, in particular even-numbered fatty acids or hydroxy-fatty acids each of 8 to 20 carbon atoms, for example the corresponding aforementioned even-numbered fatty acids and in particular their naturally occurring mixtures, such as tall oil fatty acid, tallow fatty acid, coconut oil fatty acid, palm oil fatty acid, linseed oil fatty acid, castor oil fatty acid and ricinenic acids, preferably those fatty acids mentioned having 12 to 18 carbon atoms; it is also possible to use modified fatty acids and mixtures thereof as obtainable by Friedel-Crafts reaction with aromatic hydroxy compounds, for example with phenol, o-, m- and p-cresol, guaiacol, salicylic acid, α-naphthol or β-naphthol with unsaturated fatty acids, such as palmitoleic acid, oleic acid, undecylic acid and ricinoleic acid, in the presence of strongly acid or acid-donating catalysts, for example boron trifluoride, aluminum chloride, p-toluenesulfonic acid, methanesulfonic acid, mineral acids or ion exchangers at temperatures between 50 and 200° C., preferably 120°–160° C., in the presence or absence of an organic medium, from 0.5 to 1.1 moles, preferably from 0.9 to 1 mole, of unsaturated fatty acids being used per mole of the phenols or naphthols mentioned.

It is also possible to use adducts of ethylene oxide and/or propylene oxide on aromatic carboxylic acids, such as benzoic acid, anthranilic acid, p-aminobenzoic acid, salicylic acid, o-, m- and p-tolylic acids, -methoxybenzoic and -ethoxybenzoic acids, -acetoacetamidobenzoic acids and -acetamidobenzoic acids, phenylacetic acid or naphthoic acids, in particular hydroxynaphthoic acids, for example 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid.

Furthermore, it is also possible to use adducts of ethylene oxide and/or propylene oxide on unmodified or modified natural resin acids of the rosin type or reactive derivatives thereof, preferably on resin acids such as abietic acid, dehydroabietic acid, tetrahydroabietic acid, levopimaric acid, dextropimaric acid or isodextropimaric acid, as present in commercial rosins, and on modified resin acids, such as disproportionated, hydrogenated and dimerized natural resin acids.

It is also possible to use alkoxylated di- and polycarboxylic acids, for example alkoxylates of the dicarboxylic acids mentioned hereinafter for the introduction of anionic radicals Z, in particular the substituted succinic acids mentioned there and the dimerized and trimerized fatty acids.

Of particular suitability are alkoxylation adducts on saturated or unsaturated fatty acids of 12 to 22 carbon atoms, such as lauric acid, myristic acid, palmitic acid, stearic acid, arachic acid, behenic acid, oleic acid, tallow fatty acid, tall oil fatty acid, elaidic acid, erucic acid, linoleic acid, linolenic acid, ricinoleic acid, ricinenic acid, α-eleostearic acid and β-eleostearic acid, and adducts on natural resin acids and/or hydrogenation and/or disproporportionation products thereof, as present in and obtained from commercial rosins.

f) Esterification products as obtained by esterifying the carboxylic acids used as starter materials under e) with a polyhydric alcohol, preferably a 2- to 6-hydric alcohol, in particular a 2- or 3-hydric alcohol, in a molar ratio of 1:1 or higher, which must still contain at least one free hydroxyl group, or esterification products or amides obtained in similar fashion to the esterification products with a polyhydric alcohol but by reaction with an alkylolamine.

Suitable representatives of polyhydric, preferably low molecular weight aliphatic alcohols or alkylolamines for esterifying the carboxylic acids are for example: glycerol, polyglycerols, 1,2,4-butanetriol, 1,4-butanediol, glycol, polyglycols, 1,1,1-trimethylolethane, 1,1,1-trimethylolpropane, pentaerythritol,2,4-dihydroxy-3-methylolpentane,hexanetriol, sorbitol, anhydrosorbitol, hexitol and mannitol. Preferred alkylolamines are diethanolamine and triethanolamine.

g) Alkoxylation products as obtained by addition of ethylene oxide and/or propylene oxide onto the esterification products mentioned under f);

h) alkoxylation products, in particular commercial alkoxylation products, as obtained by addition of ethylene oxide and/or propylene oxide onto aromatic compounds having at least one phenolic hydroxyl group. Examples are alkoxylation products on phenol, cresol, xylenol, α-naphthol, β- naphthol, alkylphenols or alkylnaphthols, preferably octylphenol, nonylphenol, decylphenol, dodecylphenol, tetradecylphenol, dibutylphenol, dioctylphenol, dinonylphenol, ditetradecylphenol, tripropylphenol, tributylphenol, octylnaphthol, nonylnaphthol, decylnaphthol, dodecylnaphthol, dibutylnaphthol, dihexylnaphthol, dioctylnaphthol, dinonylnaphthol, ditetradecylnaphthol and tributylnaphthol.

The hydroxynaphthoic acids are esterified in a conventional manner with the compounds mentioned under a) to f). The reaction temperature is in general between room temperature and 240° C., depending on the method of esterification. Preferably, to increase the yield, the esterification is carried out in an organic solvent which is inert under the reaction conditions and which is suitable for use as an entrainer for removing the water of reaction.

For example, the esterification can be carried out in most cases in xylene or toluene in the presence of Bronsted acids and/or Lewis acids at the boiling point of the reaction mixture, at about 110°–220° C. depending on the pressure. The acid catalysts used can be for example mineral acids such as sulfuric acid, hydrochloric acid or phosphoric acid, organic acids such as p-toluenesulfonic acid or benzenesulfonic acid, or Lewis acids such as boron fluoride, boric acid, tin powder or zinc chloride, or even a strongly acidic ion exchanger.

The hydroxynaphthoic esters obtained can be alkoxylated directly to prepare the compounds of the formula (I) according to the invention, or they can be first condensed with an aldehyde of the formula RCHO to form a novolak resin. The preparation of a novolak intermediate according to the invention can be carried out in a conventional manner; see for example Hultzsch, Chemie der Phenolharze, 1950, page 114 or Houben-Weyl, Methoden der organischen Chemie, 1963, pages 201 to 213 or U.S. Pat. No. 4,032,514 or J. Org. Chem. 43, 4905–4906. Preferred aldehydes for preparing the novolaks are formaldehyde, acetaldehyde, propionaldehyde, butyraldehyde and compounds which liberate aldehydes such as paraformaldehyde, trioxane, tetraoxymethylene or paraldehyde, preferably formaldehyde, glyoxal and acetaldehyde. The novolaks are preferably prepared with esters of hydroxynaphthoic acids and compounds of the formula (II) where p is zero.

To prepare a novolak of (m+1) hydroxynaphthoic ester units, in general (m+1) mole equivalents of hydroxynaphthoic ester are reacted with m mole equivalents of aldehyde of the formula RCHO. Preference is given to using a molar ratio of hydroxynaphthoic acid:aldehyde of 2:1 to 9:8, in particular 2:1 to 5:4, and to carrying out the condensation in the presence of acid catalysts. Suitable acid catalysts are for example mineral acids, such as sulfuric acid, hydrochloric acid and phosphoric acid, or sulfonic acids, such as dodecylbenzenesulfonic acid and preferably hydrochloric acid having a concentration of 0.1 to 5% by weight, based on the hydroxynaphthoic ester. The water of reaction formed following a reaction of in general 3 to 20 hours at 20° C. to 150° C., preferably 80° to 130° C., under nitrogen is preferably distilled off to bring the water content of the novolak resin to below 0.5%, for which a reduced pressure of less than about 65 mbar is advantageous toward the end. The novolaks obtained are more or less viscous through waxy to brittle, clear, light to dark brown resins.

The hydroxynaphthoic esters or the novolak resins prepared therefrom are alkoxylated in a conventional manner, preferably with alkali metal hydroxides or alcoholates as catalysts, at 100°–200° C., in particular at 140°–180° C. The amount of ethylene oxide or propylene oxide or both is chosen to be such that, preferably, stable emulsibility or complete solubility of the addition products in water is obtained. Advantageously, each naphtholic hydroxyl group, each further hydroxyl group and each hydrogen atom on any secondary and primary amino groups of the hydroxynaphthoic esters or of the corresponding novolak resins has added onto it up to 200, in particular 1–100, preferably 1–50, in particular 5–25 molecules of ethylene oxide or propylene oxide or both. The amount of added alkylene oxide is also proportionate to the intended use and hence to the desired degree of hydrophilicity. A suitable alkali metal hydroxide is potassium hydroxide or preferably sodium hydroxide, and a suitable alkali metal alcoholate is sodium methoxide or ethoxide; the concentration of the alkaline catalysts should preferably be 0.05–1.0% by weight, based on novolak resin, at the start of the alkoxylation. The alkoxylation can be carried out under atmospheric pressure or in pressure vessels with propylene oxide or preferably with ethylene oxide or mixtures of the two, the alkylene oxide being supplied in gas or liquid form. The operating pressure is in general 1–10, preferably 2–4, bar.

The alkoxylated hydroxynaphthoic esters obtained, and the corresponding novolak resins, are already useful surfactants. An advantageous modification of the application properties is made possible by the esterification of some or all of the terminal hydroxyl groups of the polyglycol ether chains by introducing radicals Z in place of the hydrogen of the hydroxyl groups, Z having one of the abovementioned meanings other than hydrogen.

The radicals Z can be introduced in one or more stages. A suitable method for introducing nonionic or cationic radicals Z is the esterification with monocarboxylic acids or reactive derivatives thereof. Suitable monocarboxylic acids are the monocarboxylic acids mentioned above for preparing alkoxylates of the formula (II) (see section e)). To introduce nonionic acyl radicals Z it is particularly advantageous to use:

resin acids such as abietic acid, dehydroabietic acid, tetrahydroabietic acid, levopimaric acid, dextropimaric acid and isodextropimaric acid, as present in commercial rosins, and modified resin acids, such as disproportionated, hydrogenated and dimerized natural resin acids; the esterification can also be carried out with modified natural resin acids as obtained by reacting natural resin acids with halogen-eliminating, araliphatic or aromatic compounds such as benzyl chloride, o-, m- and p-bis(chloromethyl)benzene, 2-, 3- and 4-chloromethyltoluene, benzal chloride, 1- and 2-chloromethylnaphthalene, 2-, 3- and 4-chlorophenol, 5-chloro-2-hydroxytoluene, 2-chloro-5-hydroxy-1,3-xylene, 4-chlorobiphenyl, 1- and 2-chloronaphthalene, 1-chloro-2-naphthol and 2-chloro-1-naphthol, or with alicyclic compounds such a cyclohexyl chloride in the presence of a catalyst such as zinc chloride at a temperature of 100°–200° C., using from 0.5 to 1 mole of chlorohydrocarbons mentioned per mole of resin acid.

The esterification can be also be carried out with resin-phenol compounds as obtained by addition of phenols such as hydroxybenzene, o-, m- and p-cresol, orthocresol acetate, salicylic acid, guaiacol, bisphenol A, α-naphthol and β-naphthol onto natural resin acids or commercial rosins in the presence of strongly acidic or acid-eliminating catalysts, for example boron trifluoride, hydrogen chloride, tin tetrachloride, aluminum trichloride or mineral acids, at a temperature of preferably 20° to 120° C. in an organic medium or in the presence of a strongly acidic ion exchanger at preferably 120° to 200° C., in particular at 150° to 170° C., using from 0.5 to 0.8, preferably from 0.65 to 0.75, mole of the phenols mentioned per mole of resin acid.

Preferably, nonionic acyl radicals Z can also be introduced by esterification with saturated or unsaturated carboxylic acids or hydroxycarboxylic acids, in particular fatty or hydroxy-fatty acids, for example acetic acid, propionic acid, butyric acid, valeric acid, caproic acid, heptanoic acid, octanoic acid, pelargonic acid, capric acid, lauric acid, myristic acid, palmitic acid, stearic acid, arachic acid, behenic acid, oleic acid, linoleic acid, tallow fatty acid and ricinoleic acid, preferably the abovementioned fatty acids of 12–18 carbon atoms, in particular those which are commercially available as fatty acids or fatty acid mixtures.

Nonionic or cationic acyl radicals can also be introduced by esterification with aromatic carboxylic acids, such as benzoic acid, anthranilic acid, p-aminobenzoic acid, salicylic acid, o-, m- and p-tolylic acids, -methoxybenzoic and -ethoxybenzoic acids, -acetoacetamidobenzoic acids and -acetamidobenzoic acids, phenylacetic acid or naphthoic acids, in particular hydroxynaphthoic acids, for example 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid.

The esterification with the carboxylic acids mentioned can be carried out similarly to the above-described esterification of hydroxynaphthoic acids with compounds of the formula (II).

Alternatively, the esterification of alkoxylated hydroxynaphthoic esters, or of corresponding novolaks, with the abovementioned monocarboxylic acids can also be carried out by transesterification with the corresponding alkyl esters, preferably methyl esters, of the carboxylic acids mentioned in the presence of 0.1–1.0 mole equivalent of alcoholates, preferably sodium methylate, at 150°–200° C., preferably 160°–190° C., with distillative removal of the liberated alkanol or methanol.

To introduce anionic acyl radicals Z, the alkoxylated hydroxynaphthoic esters, corresponding novolaks or the partially esterified alkoxylates formed from the above alkoxylates with the abovementioned monocarboxylic acids can be reacted with dicarboxylic acids, polycarboxylic acids, sulfuric acid or chlorosulfonic acid or anhydrides. Suitable dicarboxylic acids and anhydrides for the esterification are for example: maleic acid, maleic anhydride, furamic acid, phthalic acid, phthalic anhydride, isophthalic acid, terephthalic acid, oxalic acid, malonic acid, succinic acid, succinic anhydride, glutaric acid, adipic acid, pimelic acid, suberic acid, azelaic acid and sebacic acid.

Alternatively, the second reaction stage or a third reaction stage can be used to monoesterify free hydroxyl groups with alkyl-, alkenyl- or alkylidene-succinic acid or anhydrides. Suitable α-alkylated succinic acids are in particular those having straight-chain radicals from the group consisting of octyl, nonyl, decyl, undecyl, dodecyl, tridecyl, tetradecyl, pentadecyl, hexadecyl, heptadecyl and octadecyl, which preferably have a double bond, in particular a double bond between the second and third carbon atoms in the alkyl radical, and also α-alkylated succinic acids and anhydrides which contain a branched saturated or unsaturated $C_8$–$C_{12}$-alkyl radical, in particular a tripropylene or tetrapropylene radical. Preferred α-alkylated succinic acids are obtainable for example by reacting n-octene, n-nonene, n-decene, n-undecene, n-dodecene, n-tridecene, n-tetradecene, n-pentadecene, n-hexadecene, n-heptadecene, n-octadecene, tripropylene or tetrapropylene with maleic anhydride in the presence of acid catalysts (see for example the paper in Angew. Chem. 81, (1969), 597–618, on the ene reaction, and references cited therein, and U.S. Pat. No. 3,306,901).

The esterification with α-alkylated succinic anhydrides is preferably carried out at 20°–100° C., in particular 40°–80° C., in the presence of 0.1–1.0% by weight of alkali metal hydroxides, based on the total mixture.

It is also particularly advantageous to use dimerized or trimerized (unsaturated) fatty acids, preferably those based on $C_{12}$–$C_{20}$-fatty acids, in particular $C_{16}$–$C_{18}$-fatty acids.

Preferably, the anionic groups are introduced by reaction with maleic anhydride or phthalic anhhydride by mixing and stirring at 20°–100° C., preferably at 40°–80° C., in the presence of alkali metal hydroxides. The concentration of alkali metal hydroxide should be 0.1–1.0% by weight, based on the total mixture. In the case of maleic anhydride, it is advantageous, on account of the sublimation tendency, to work in pressure vessels under a superatmospheric pressure of 0.2–1.0 bar of nitrogen or air and to ensure thorough mixing since at the start of the reaction the molten maleic anhydride is reluctant to mix with the partially esterified alkoxylates.

In the case of introduced maleic monoester groups, it is additionally advantageous to convert these monoester groups into the corresponding sulfosuccinic monoester groups. This is possible for example by adding aqueous solutions of sulfites or bisulfites to the compounds which have maleic monoester groups. For every maleic monoester group from 1.0 to 1.5, preferably from 1.0 to 1.1, moles of sulfurous acid are added in the form of alkali metal or alkaline earth metal sulfites, bisulfites or pyrosulfites. The amount of water added is in general about 50–85% by weight, based on the total solution or mixture, and depends on the solubility of the sulfosuccinic monoester salts and the viscosity of the solutions. The temperature for the reaction of sulfites with the maleic monoester compounds is in general 20°–100° C., preferably 40°–80° C.

While sulfites are particularly suitable for forming the dialkali metal salts of sulfosuccinic monoesters, the addition of bisulfites makes it possible, by neutralization with bases such as ammonia, low molecular weight alkylamines or alkylolamines or alkylene oxide adducts thereof, up to about 150 moles of ethylene oxide or propylene oxide or both having been added per mole of amine or alkylolamine and up to 150, preferably 5–30, mole equivalents of ethylene oxide or propylene oxide or both having been added per reactive hydrogen atom in the compounds mentioned, to have an additional effect on the degree of hydrophilicity. Suitable representatives of alkylamines or alkylolamines are: ethylamine, propylamine, isopropylamine, butylamine, isobutylamine, monoethanolamine, monopropanolamine, monoisopropanolamine, monobutanolamine, monoisobutanolamine, diethanolamine, dipropanolamine, dibutanolamine, triethanolamine, tripropanolamine or tirbutanolamine and di- and polyamines such as ethylenediamine, ethylenetriamine, triethylenetetramine, propylenediamine, dipropylenediamine, dipropylenetriamine or tripropylenetetramine.

The cation exchange described with reference to sulfosuccinic monoesters can also be carried out on compounds of the formula (I) which have other anionic groups. For this, the compounds are used in their acid form and are converted in a similar manner by neutralization with the abovementioned amines or inorganic bases into the corresponding salts. It is also possible to use other cation exchange methods.

The free hydroxyl groups of the alkoxylated and partially esterified novolaks can be sulfated in a conventional manner using as the sulfating reagent for example sulfuric acid, chlorosulfonic acid, sulfamic acid, $SO_3$ gas with inert gas, or an $SO_3$ adduct, for example $SO_3$-diluted dioxane. The sulfation is effected by thorough mixing, if necessary in the presence of an inert diluent, for example methylene chloride. Depending on the sulfating agent, the sulfation temperature is from 0° to about 150° C. The amount of sulfating agent to be used can be proportioned in such a way that all free hydroxyl groups or only some are converted.

While sulfation with sulfamic acid gives the ammonium salts of the sulfuric monoesters, the technologically most interesting embodiment with gaseous sulfur trioxide mixed with inert gas and the sulfation with chlorosulfonic acid gives rise to the sulfuric monoesters in the acid form, from which it is an easy matter to prepare the desired salts by neutralization with appropriate inorganic or organic bases. This neutralization is preferably accomplished with alkali metal hydroxides which lead to the very readily water-soluble alkali metal salts of the sulfuric monoesters according to the invention.

The present invention also provides for the use of the compounds of the formula (I) according to the invention as surfactants. The compounds according to the invention and the mixtures thereof are substances which because of their favorable surface-active properties are extremely versatile. For instance, they form stable emulsions or clear solutions in water. They conform to the definition of surface-active compounds laid down in German Standard Specification DIN 53 900. They reduce the surface tension as judged by the ring pull-off method (DIN 53914) and are low-foaming to almost foam-free by the Ross-Miles Test (DIN 53902). In addition, they wet cotton fabric by the dip wetting method (DIN 53901) and are stable to alkali and strong acids under customary surfactant application conditions. Furthermore, they are very good antiflocculants with respect to dyes and pigments (DIN 53 908) and have very good water dispersing characteristics for cleaning boosters (DIN 53 980), and combine good leveling characteristics (DIN 53 988) with good washoff characteristics as yarn lubricants (DIN 53 504). They are in general also characterizable in more detail in terms of the Krafft point (DIN 53 918), by the determination of the cloud point (DIN 53 917) or by the titration number (DIN 53 989). The compounds are generally readily biodegradable. The biodegradability is determined for example in accordance with DIN 38 412.

The substances according to the invention can be used not only as emulsifiers but also as dispersants for a very wide range of applications. This is true in particular of the use as a coupling aid or formulation aid or both in the preparation of azo compounds, preferably azo colorants, in particular azo pigments. The compounds according to the invention are suitable for use as emulsifiers for preparing metal processing aids, carrier emulsions, drycleaning boosters and polymerization products and for use in the petroleum industry.

The compounds according to the invention are also highly suitable for use as dispersants for preparing low-foam dispersions of pigments, dyes and fluorescent whitening agents and for the formulation of crop protection agents and pesticides, and also as flotation aids and as leveling and dyeing assistants for dyeing natural and synthetic fiber materials such as cotton, wool, cellulose, rayon, cellulose acetate and triacetate, polyester, polyamide and polyacrylonitrile or fiber materials which contain these substances.

The compounds according to the invention can be used individually or as mixtures and also in combination with other nonionic, anionic or cationic surfactants or mixtures thereof. Furthermore, they can be used together with builders or other customary additives or assistants in emulsifier and dispersant formulations. In the Examples which follow, parts and percentages are by weight. Parts by volume bear the same relation to parts by weight as the kilogram to the liter. Pressures are pressures above atmospheric pressure, unless otherwise stated. The acid number AN) is determined in accordance with DIN 53 402 and the hydroxyl number in accordance with DIN 53 240. "EO" and "PO" are abbreviations for respectively ethyleneoxy and propyleneoxy units within polygylcol ether chains.

EXAMPLES

1a) Ester of 3-hydroxy-2- naphthoic acid+(oleic acid+6EO)

188 parts of 3-hydroxy-2-naphthoic acid and 546 parts of a commercial adduct of oleic acid and 6 mole equivalents of ethylene oxide are heated to 90° C.–100° C. and thoroughly mixed under nitrogen. After 3 parts of p-toluenesulfonic acid and 150 ml of xylene have been added, the mixture is heated at 155°–165° C. for 8–10 hours, and the water of reaction is removed azeotropically. Xylene is then distilled off and stirring is subsequently continued at 210° to 220° C. under nitrogen for 4 hours. The product obtained has an acid number of less than 50.

1b) Ethoxylate of 1a)

200 parts of 3-hydroxy-2-naphthoic ester 1a) are alkoxylated in a pressure vessel after one part of sodium hydroxide has been added by stirring and feeding in 580 parts of ethylene oxide at 150° to 160° C. under a pressure maintained at about 1.5 to 2 bar. After all the ethylene oxide has been injected, stirring is continued at 150 to 160° C. for one hour. The alkoxylated naphthoic ester obtained contains on average 48 ethyleneoxy units per molecule and has a hydroxyl number of about 20.

2a) Adduct of 1a)+14 EO 200 parts of ester 1a) are reacted with 240 parts of ethylene oxide as described in Example 1b). The ethoxylated naphthoic ester obtained contains on average a total of 20 ethyleneoxy units per molecule and has a hydroxyl number of about 35.

2b) Sulfosuccinic monoester of 2a)

300 parts of the ethyoxylate obtained as described in 2a) are esterified at 70° to 80° C. under nitrogen in the course of 3 hours by addition of 18.2 to 19.1 parts of maleic anhydride and 0.3 parts of sodium hydroxide. Thereafter water is added, followed by 23.4 to 24.6 parts of sodium sulfite as an aqueous solution at 70° to 80° C. in the course of 15 to 20 minutes. As soon as the batch has become clear, stirring for another hour is started. The amount of water added can be between 50 and 85% of the ready-prepared solution.

3a) Ester of 6-hydroxy-2-naphtholic acid + (stearic acid + 88 EO)

284 parts of stearic acid are reacted under nitrogen with 8 parts of ethylene oxide in the presence of 1.5 parts of sodium hydroxide at an internal temperature of 150° to 160° C. and a pressure of 4 to 6 bar. After neutralization with acetic acid and addition of 3 parts of p-toluenesulfonic acid, 150 parts by volume of xylene and 188 parts of 6-hydroxy-2-naphthoic acid, the mixture is heated at 155° to 165° C. for 10 to 12 hours, and the water of reaction is removed azeotropically. After the xylene has been distilled off, the batch is stirred at 210 to 230° C for a further 4 hours. The ester obtained has an acid number of less than 36.

3b) 5-nucleus novolak resin based on 3a)

500 parts of 3a) are introduced initially at room temperature, and 1.5 parts of dodecylbenzenesulfonic acid in 10 parts of water are added with slow stirring. The temperature is raised to 100°–120° C. under nitrogen, and 66 parts of formaldehyde (36% strength in water) are added dropwise in the course of 1 to 2 hours, and the mixture is subsequently stirred at 120° C. for 4 hours. After the internal temperature has been raised to 130°–135° C., the water of reaction is removed under reduced pressure at 20 to 30 mbar in the course of 1 hour, and the batch is subsequently stirred at the same temperature for 2 hours. This gives 515 parts of a dark brown waxily soft novolak resin.

3c) Ethoxylate of 3b)

200 parts of 5-nucleus novolak resin 3b) are reacted with 569 parts of ethylene oxide as described in Example 1b) The ethoxylate contains in total on average 178 ethyleneoxy units per molecule. The hydroxyl number is about 27.

3d) Sulfosuccinic monoester of 3c)

300 parts of the ethoxylate obtained as described in 3c) are esterified at 70° to 80° C. under nitrogen in the course of 3 hours by addition of 13.8 to 14.1 parts of maleic anhydride and 0.3 part of sodium hydroxide. After diluting with water, 17.7 to 18.2 parts of sodium sulfite are added as an aqueous solution at 70° to 80° C. in the course of 15 to 20 minutes. As soon as the batch has become clear, another hour of stirring commences. The amount of water added can be between 50 and 85% of the ready-prepared solution of the product.

4a) Ester of 3-hydroxy-2-naphthoic acid + oleyl alcohol 188 parts of 3-hydroxy-2-naphthoic acid and 268 parts of a commercial oleyl alcohol are heated to an internal temperature of 90°–100° C. and thoroughly mixed under nitrogen. After 2 parts of p-toluenesulfonic acid and 150 parts of xylene have been added, the temperature is raised to 150°–160° C., and the water of reaction is removed azeotropically over 12 hours. After the xylene has been distilled off, the batch is stirred at 200 to 210° C. for a further 2 hours. The product has an acid number of less than 36.

4b) Ethoxylate of 4a)

200 parts of product 4a) are ethoxylated in a pressure vessel after 1.1 parts of freshly pulverized sodium hydroxids have been added by stirring and introducing 600 parts of ethylene oxide at an internal temperature of 50° to 160° C while the pressure is maintained at 2 to 4 bar. The resulting brown viscous ethoxylate contains an average of 30 ethyleneoxy units per molecule and has a hydroxyl number of about 33. The product gives a clear solution in water.

5a) Ester of 3-hydroxy-2-naphthoic acid + (rosin + 15 EO)

188 parts of 3-hydroxy-2-naphthoic acid and 964 parts of a disproportionated rosin ethoxylated with 15 moles of ethylene oxide are esterified as described in Example 4a) after 1 part of p-toluenesulfonic acid and 4 parts of tin powder have been added until the acid number is less than 37.

5b) Ethoxylate of 5a)

200 parts of product of Example 5a) are reacted after 1.1 parts of freshly pulverized sodium hydroxide have been added with 158 parts of ethylene oxide as described in Example 4b). The resulting brown viscous ethoxylate contains in total on average 35 ethyleneoxy units per molecule and has a hydroxyl number of about 33. The product gives a clear solution in water.

6a) Ester of 6-hydroxy-2-naphthoic acid + (nonylphenol + 10 EO)

188 parts of 6-hydroxy-2-naphthoic acid and 660 parts of a commercial nonylphenol ethoxylate with 10 ethyleneoxy units per molecule are esterified as described in Example a) after 3 parts of p-toluenesulfonic acid have been added until the acid number is less than 35.

6b) Ethoxylate of 6a)

200 parts of product of 6a) are reacted as described in Example 4b) with 156 parts of ethylene oxide after 1.3 parts of freshly pulverized sodium hydroxide have been added. The resulting brown viscous ethoxylate contains on average in total 25 ethyleneoxy units per molecule. The product gives a clear solution in water and has a hydroxyl number of about 40.

7a) Ester of 6-hydroxy 2-naphthoic acid + (tall oil fatty acid + 6 EO)

188 parts of 6-hydroxy-2-naphthoic acid and 546 parts of a commercial ethoxylate of tall oil fatty acid and 6 mole equivalents of ethylene oxide are esterified as described in Example 4a) after 1.5 parts of p-toluenesulfonic acid have been added until the acid number is less than 31.

7b) Ethoxylate of 7a)

200 parts of product of 7a) are reacted as described in Example 4b) with 166 parts of ethylene oxide after 1.5 parts of freshly pulverized sodium hydroxide have been added. The resulting brown viscous ethoxylate contains an average in total of 20 ethyleneoxy units per molecule and has a hydroxyl number of about 42. The end product gives a stable, transparent emulsion in water.

8a) Ester of 6-hydroxy-2-naphthoic acid + (stearamide + 4 EO)

188 parts of 6-hydroxy-2-naphthoic acid and 447 parts of a commercial ethoxylate of stearamide and 4 mole equivalents of ethylene oxide are esterified as described in Example 4a) after one part of p-toluenesulfonic acid has been added until the acid number is less than 29.

8b) Ethoxylate of 8a)

300 parts of the product of Example 8a) are admixed in a pressure vessel with 3.5 parts of 30% strength solution of sodium methoxide in methanol, the methanol is drawn off under reduced pressure by heating to 40°–80° C., and the batch is ethoxylated under a pressure of 4.4 to 6.0 bar by heating to 145°–160° C. and feeding in 291 parts of ethylene oxide with stirring. The resulting dark brown waxily soft ethoxylate contains in total about 25 ethyleneoxy units per molecule. The product has a hydroxyl number of about 72 and produces a stable transparent emulsion in water.

9a) Ester of 6-hydroxy-2-naphthoic acid + (ricinenic fatty acid + 6 EO)

188 parts of 6-hydroxy-2-naphthoic acid and 544 parts of an ethoxylate of commercial ricinenic fatty acid containing 25% of linoleic oil and 6 mole equivalents of ethylene oxide are esterified, as described in Example 1a) after 1.5 parts of p-toluenesulfonic acid have been added until the acid number is less than 35.

9b) Ethoxylate of 9a)

200 parts of product of Example 9a) are reacted as described in Example 8b) with 252 parts of ethylene oxide after 4 parts of sodium methoxide solution have been added. The resulting reddish brown viscous ethoxylation adduct contains on average in total 25 ethyleneoxy units per molecule and has a hydroxyl number of about 41.

9c) Sulfosuccinic monoester of 9b)

300 parts of the ethoxylate obtained as described in 9b) are esterified at 70° to 80° C. under nitrogen in the course of 3 hours by adding 21.5 to 22.6 parts of maleic anhydride and 0.3 part of sodium hydroxide. Thereafter water is added, followed by 29.6 to 32.5 parts of sodium sulfite as an aqueous solution at 50° to 60° C. in the course of 120 minutes with stirring. After the batch has become capable of forming a clear solution in water, a further hour of stirring commences. The amount of water added can be between 50 and 85% of the ready-prepared solution.

10a) Ester of 6-hydroxy-2-naphthoic acid + oleic acid triethanolamine ester 188 parts of 6-hydroxy-2-naphthoic acid and 413 parts of a commercial oleic acid triethanolamine monoester are esterified as described in Example 1a) on addition of 1.5 parts of p-toluenesulfonic acid until the acid number is less than 25.

10b) Ethoxylate of 10a)

200 parts of product 10a) are ethoxylated with 302 parts of ethylene oxide as described in Example 8b) on addition of one part of freshly pulverized sodium hydroxide and 2 parts of sodium methoxide solution. The resulting reddish brown viscous ethoxylate contains on average 20 ethyleneoxy units per molecule and has a hydroxyl number of about 77. The end product forms a stable emulsion in water.

11a) Ester of 6-hydroxy-2-naphthoic acid + rosin ester 188 parts of 6-hydroxy-2-naphthoic acid and 376 parts of a monoester of a commercial disproportionated rosin and glycerol are esterified as described in Example 5a) on addition of 13 parts of p-toluenesulfonic acid and 4 parts of tin powder until the acid number is less than 25.

11b) Ethoxylate of 11a)

200 parts of product 11a) are reacted with 468 parts of ethylene oxide as described in Example 8b) on addition of one part of freshly pulverized sodium hydroxide and 3 parts of sodium methoxide. The resulting brownish green liquid ethoxylate contains on average 30 ethyleneoxy units per molecule and has a hydroxyl number of about 40.

11c) Maleic monoester of 11b)

300 parts of the ethoxylate obtained as described in 11b) are stirred with 31.4 to 34.5 parts of maleic anhydride and 0.5 part of sodium hydroxide at 70° to 80° C. under nitrogen for 3 hours, then diluted with water and neutralized with sodium hydroxide solution. The amount of water added can be between 50 and 80% of the ready-prepared solution.

12) Phthalic monoester of 11b)

300 parts of ethoxylate 11b) are stirred with 47.5 to 52.8 parts of phthalic anhydride and 0.56 part of sodium hydroxide at 70° to 80° C. under nitrogen for 4.5 hours, then diluted with water and neutralized with sodium hydroxide solution. The amount of water added can be between 50 and 80% of the ready-prepared product solution.

13a) Ester of 6-hydroxy-2-naphthoic acid + (isononanoic acid + 6 EO)

188 parts of 6-hydroxy-2-naphthoic acid and 430 parts of an ethoxylate of a commercial isonananoic acid and 6 mole equivalents of ethylene oxide are esterified as described in Example 1a) on addition of 15 parts of p-toluenesulfonic acid until the acid number is less than 25.

13b) 5-nucleus novolak resin based on 13a)

500 parts of the product of Example 13a) are condensed as described in Example 3b) by addition of 1.5 parts of dodecylbenzenesulfonic acid, dissolved in 10 parts of water, by blanketing with nitrogen, by raising the internal temperature to 100°–120° C. and by the dropwise addition of 58.2 parts of formaldehyde (36% strength in water), with simultaneous removal of the water of reaction. About 510 parts of a brownish waxily solid novolak resin are obtained.

13c) Ethoxylate of 13b)

200 parts of the product of 13b) are reacted with 206 parts of ethylene oxide as described in Example 1b). The ethoxylate contains in total on average 105 ethyleneoxy units per molecule and has a hydroxyl number of about 55.

14a) Ester of 6-hydroxy-2-naphthoic acid + (fatty alcohol + 6 EO)

188 parts of 6-hydroxy-2-naphthoic acid and 462 parts of a commercial $C_{12}$–$C_{14}$-fatty alcohol with 6 moles of ethylene oxide are esterified as described in Example 4a) on addition of 1.3 parts of p-toluenesulfonic acid until the acid number is less than 40.

14b) 5-nucleus novolak resin based on 14a)

500 parts of the product of Example 14a) are admixed with 52.4 parts of butyraldehyde and, on addition of 3 parts of concentrated hydrochloric acid, condensed at an internal temperature of 110° C. for 15 hours, all this being carried out as described in Example 3b).

14c) Ethoxylate of 14b)

200 parts of the novolak obtained as described in 14b) are reacted with 290 parts of ethylene oxide in a pressure vessel at an internal temperature of 150 to 160° C. following addition of 1.5 parts of 30% strength methanolic sodium methoxide solution, similarly to the procedure described in Example 8b). The resulting viscous ethoxylate contains on average 100 ethyleneoxy units per molecule and has a hydroxyl number of about 30.

14d) Sulfosuccinic monoester of 14c)

500 parts of the ethoxylate obtained as described in 14c) are reacted as described in Example 9c) with 26.2 to 28.8 parts of maleic anhydride and 33.7 to 27.0 parts of sodium sulfite in the presence of added water. The amount of added water can be between 50 and 85% of the ready-prepared product solution.

15a) Ester of 6-hydroxy-2-naphthoic acid + (tallow fatty acid + 10 EO)

188 parts of 6-hydroxy-2-naphthoic acid and 709 parts of an ethoxylate of a commercial tallow fatty acid and 10 mole equivalents of ethylene oxide are esterified as described in Example 1a) on addition of 1.5 parts of p-toluenesulfonic acid until the acid number is less than 25.

15b) 3-nucleus novolak resin based on 15a)

500 parts of the product of Example 15a) are introduced first, and 15.5 parts of paraformaldehyde are added at room temperature with slow stirring. Stirring is continued at 50° C. for one hour under nitrogen, the internal temperature is then raised to 90° C. and 5.6 parts of concentrated hydrochloric acid are added dropwise. Stirring is then continued at 110° C. for 6 hours during which nitrogen is passed through, the internal temperature is then raised to 135°–140° C., and the water of reaction is distilled off in the course of 4 hours. The pressure is then reduced to 20–30 mbar, and stirring is continued at 135°–140° C. for 2 hours. About 490 parts of a dark brown solid resin are obtained.

15c) Ethylene oxide/propylene oxide adduct on 15b)

400 parts of novolak resin 15b) are alkoxylated in a pressure vessel at 145°–160° C. under a pressure of about 3.4 to 5 bar by addition of 4.5 parts of 30% strength methanolic sodium methoxide solution with stirring and by introducing 477 parts of propylene oxide and 562 parts of ethylene oxide after drawing off the methanol. After all the alkylene oxide has been introduced, the mixture is stirred at 150°–160° C. for 1 hour. The alkoxylate then contains in total on average 45 propyleneoxy units and 69.8 ethyleneoxy units per molecule and has a hydroxyl number of about 23.

15d) Sulfosuccinic monoester of 15c)

500 parts of alkoxylate 15c) are esterified as described in Example 2b) on addition of 20.9 to 22.1 parts of maleic anhydride and 0.5 part of sodium hydroxide. The batch is then diluted with water and admixed with 26.8 to 29.5 parts of sodium sulfite, added as an aqueous solution at 70° to 80° C. in the course of 20 minutes, until the batch has become clear. It is then stirred for an hour. The amount of water added is preferably between 50 and 85% of the prepared solution of the product.

16a) Ester of 6-hydroxy-2-naphthoic acid + resin alcohol 188 parts of 6-hydroxy-2-naphthoic acid and 290 parts of a commercial dihydroabietyl alcohol are esterified as described in Example 5a) on addition of 1 part of p-toluenesulfonic acid and 4 parts of tin powder until the acid number is less than 35.

16b) Ethoxylate of 16a)

200 parts of the product of 16a) are reacted with 460 parts of ethylene oxide in a pressure vessel at an internal temperature of 150° to 160° C. as described in Example 9b) on addition of 1.5 parts of sodium methoxide solution. The resulting viscous ethoxylate contains 25 ethyleneoxy units per molecule and has a hydroxyl number of about 40.

16c) Sulfosuccinic monoester of 16b)

300 parts of the ethoxylate obtained as described in 16b) are reacted similarly to compound 2b) with 21.0 to 23.1 parts of maleic anhydride at 70° to 80° C. and 27.0 to 29.8 parts of sodium sulfite as an aqueous solution. The amount of water added is preferably between 50 and 85% of the ready-prepared solution of the product.

17) Phthalic monoester triethanolamine salt of 16b)

300 parts of the ester ethoxylate obtained as described in Example 16b) are stirred together with 0.5 part of sodium hydroxide and 31.7 parts of phthalic anhydride at 80° to 90° C. under nitrogen for 4 hours, and diluted with water and neutralized with 32 parts of triethanolamine. The amount of water added is preferably between 50 and 80% of the ready-prepared solution of the product.

18a) Ester of 6-hydroxy-2-naphthoic acid + (oleic acid + 6 EO)

188 parts of 6-hydroxy-2-naphthoic acid and 546 parts of commercial adduct of oleic acid and 6 mole equivalents of ethylene oxide are esterified as described in Example 1a) until the acid number is less than 40.

18b) 5-Nucleus novolak resin based on 18a)

500 parts of the product of 18a) are condensed as described in Example 3b) over 10 hours with 51.2 parts of formaldehyde (36% strength in water) on addition of 2 parts of dodecylbenzenesulfonic acid, dissolved in 12 parts of water, the water of reaction being removed by distillation. Cooling down leave a brown waxy solid novolak resin (yield about 495 parts).

18c) Ethoxylate of 18b)

200 parts of the 5-nucleus novolak resin 18b) are reacted with 523 parts of ethylene oxide as described in Example 3c). The product contains on average 215.7 ethyleneoxy units per molecule and has a hydroxyl number of about 65.

18d) Benzoic partial ester of 18c)

300 parts of the ethoxylate obtained as described in 18c) and 17.1 parts of benzoic acid are thoroughly mixed under nitrogen with 150 parts of xylene and 1.5 parts of toluenesulfonic acid and esterified at 155° to 160° C. over 8 hours with azeotropic removal of the water of reaction until the acid number is less than 10. The hydroxyl number of the partial ester is 39.

19) Benzoic/sulfosuccinic coester of 18c)

210 parts of benzoic partial ester 18d) are reacted as described in Example 3d) with 20.4 to 22.4 parts of maleic anhydride and a solution of 26.3 to 28.9 parts of sodium sulfite in 390 parts of water to give the sulfosuccinic monoester. The amount of added water is preferably 50 to 85% of the ready-prepared solution of the product.

20) Ester of 6-hydroxy-2-naphthoic acid + (rosin + 15 EO)

188 parts of 6-hydroxy-2-naphthoic acid are esterified as described in Example 5a) with 1404 parts of an ethoxylate of disproportionated rosin and 15 mole equivalents of ethylene oxide on addition of 2 parts of p-toluenesulfonic acid and 6 parts of tin powder until the acid number is less than 31. The product forms a stable emulsion in water and is suitable for azo coupling.

21) Ester of 3-hydroxy-2-naphthoic acid + (tall oil fatty acid + 25 EO)

188 parts of 3-hydroxy-2-naphthoic acid are esterified as described in Example 1a with 1382 parts of an ethoxylate of commercial tall oil fatty acid and 25 parts of ethylene oxide on addition of 1.5 parts of p-toluenesulfonic acid until the acid number is >35. The product forms a stable emulsion in water and is coupleable with diazonium salts.

22) Ester of 3-hydroxy-2-naphthoic acid + (tallow fatty propylenediamine + 20 EO)

188 parts of 3-hydroxy-2-naphthoic acid are esterified as described in Example 1a) with 1256 parts of an ethoxylate of a tallow fatty propylenediamine and 20 mole equivalents of ethylene oxide on addition of 2.5 parts of p-toluenesulfonic acid until the acid number is less than 25. The surface-active product forms a stable emulsion in water and has coupling properties.

23) Hydroxynaphthoic ester of 3c)

500 parts of the 5-nucleus novolak ethoxylate of Example 3c) are esterified with 18.4 parts of 3-hydroxy-2-naphthoic acid on addition of 5 parts of p-toluenesulfonic acid until the acid number is less than 20. The surface-active product forms a clear solution in water and has coupling properties.

24) Sulfuric ester of 18c)

300 parts of the ethoxylate obtained as described in 18c) are diluted with 250 parts by volume of methylene chloride and admixed with 40.5 parts of chlorosulfonic acid at 15° to 20° C. while dry nitrogen is passed through the solution in a slow stream to remove the escaping hydrogen chloride gas via a reflux condenser. Toward the end of reaction the temperature is raised to 30° C., and the mixture is stirred until no further hydrogen chloride gas escapes. After the methylene chloride has been distilled off at 30° C. under reduced pressure, 500 parts of water are added, followed by 29 parts of 33% strength sodium hydroxide solution for neutralization. The amount of water added is preferably 50 to 85% of the ready-prepared solution of the product.

25) Ester of 6-hydroxy-2-naphthoic acid + (dimerized fatty acid + 25 EO)

300 parts of a commercial dimerized fatty acid containing 22 parts by weight of trimerized fatty acid (®Pripol 1017) are reacted in the presence of 1.5 parts of freshly pulverized sodium hydroxide with 381 parts of ethylene oxide under nitrogen at an internal temperature of 140° to 160° C. and under a pressure of 3 to 5 bar. Neutralization with acetic acid and addition of 3 parts of p-toluenesulfonic acid, 150 parts by volume of xylene and 65 parts of 6-hydroxy-2-naphthoic acid is followed by heating at 155°–165° C. for 10 to 12 hours during which the water of reaction is removed azeotropically. After the xylene has been distilled off, the batch is stirred at 200° to 230° C. for a further 2 hours. The ester obtained has an acid number of less than 20 and coupling properties.

26a) Ethoxylate of 25)

200 parts of the ester of 25) are reacted with 62 parts of ethylene oxide as described in Example 1b). The ethoxylate contains in total on average 40 ethyleneoxy units per molecule and has a hydroxyl number of about 62.

26b) Sulfosuccinic monoester of 26a)

250 parts of the ethoxylate obtained as described in 26a) are reacted as described in Example 9c) with 27 to 28.4 parts of maleic anhydride and 34.7 to 36.4 parts of sodium sulfite in the presence of added water. The amount of added water can be between 50 and 85% of the ready-prepared solution of the product.

27a) Ester of dimerized fatty acid and triethanolamine 300 parts of dimerized fatty acid corresponding to Example 25) are esterified as described in Example 1a) with 103 parts of triethanolamine in the presence of 1.5 parts of p-toluenesulfonic acid until the acid number is 5.6.

27b) Ethoxylate of 27a)

300 parts of fatty acid triethanolamine ester 27a) are reacted with 247.5 parts of ethylene oxide as described in Example 8b) on addition of 5 parts of 30% strength nethanolic sodium methoxide solution. The ethoxylate contains 18 ethyleneoxy units per molecule and has a hydroxyl number of about 128.

27c) Ester of 6-hydroxy-2-naphthoic acid + (dimeric acid triethanolamine ester + 12 EO)

400 parts of ester 27a) are esterified as described in Example 1a) with 50.3 parts of 6-hydroxy-2-naphthoic acid in the presence of 1.5 parts of p-toluenesulfonic acid until the acid number is less than 25.

27d) Ethoxylate of 27c)

400 parts of ester 27c) are reacted as described in Example 4b) with 210 parts of ethylene oxide on addition of 1.3 parts of freshly pulverized sodium hydroxide.

The ethoxylate contains in total 38 ethyleneoxy units per molecule and has a hydroxyl number of about 60.

We claim:

1. A compound of the general formula (I)

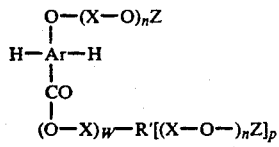   (I)

where

Ar is naphthalene, each X is independently of the others 1,2-ethylene or 1,2-propylene, or a combination thereof, n and w are each independently of the others a number from 0 to 150 with at least one of the numbers n and w being different from 0, and the total number (n+w) of all alkyleneoxy units amounts from 2 to 150, each z is independently of the other z radicals a hydrogen atom or an anionic, nonionic or cationic aliphatic, alicyclic, aromatic, araliphatic or aralicyclic acyl radical of 1 to 60 carbon atoms or a group of the formula —$SO_3M$, where M is a cation, each R' is independently of the other R' radicals an amine or amide nitrogen atom or an aliphatic, alicyclic or aromatic radical or a combination of two or more such hydrocarbon radicals, the radical R' having a total of 1 to 60 carbon atoms and being boned to the adjacent X radicals and, if w=0, to the CO group either via an oxygen atom or via an amine or amide nitrogen atom, and each p is independently of the other p indices a number from 0 to 6.

2. A compound as claimed in claim 1, wherein

Ar is naphthalene, each Z is independently of the others a hydrogen atom or an anionic or nonionic aliphatic, alicyclic, aromatic or araliphatic acyl radical of in total 1 to 40 carbon atoms or a group of the formula —$SO_3M$, where M is a cation, each R' is independently of the others an aliphatic, alicyclic, aromatic, araliphatic or aralicyclic radical of 1 to 40 carbon atoms which is bonded to the adjacent X radicals and, if w=0, to the CO group via an oxygen or amine or amide nitrogen atom, each p is independently of the others from 0 to 3, X is 1,2-ethylene or 1,2-propylene and each n is independently of the others from 1 to 100.

3. A compound as claimed in claim 1, which contains at least one nonionic or anionic acyl radical Z from the group consisting of the following structures:

—CO—$R^1$,

—CO—CH=CH—COOM,

—CO—$CH_2$—CH($SO_3M$)—COOM,

—CO—$C_6H_4$—COOM,

—CO—$R^*$[—COOM]$_k$ and

—$SO_3M$, where in the foregoing formulae $R^1$ is a saturated or unsaturated, straight-chain or branched hydrocarbon radical of 1 to 19 carbon atoms which is unsubstituted or substituted by a hydroxyl group, or is a phenyl or naphthyl radical which is unsubstituted or monosubstituted, disubstituted or trisubstituted by radicals from the group consisting of $C_1$-$C_{14}$-alkyl, benzyl, phenylethyl, $C_1$-$C_4$-alkoxy, $C_1$-$C_4$-alkanoyl, carbamoyl, phenyl, mono- or di-($C_1$-$C_4$-alkyl)aminocarbonyl and hydroxyl, or is a polycyclic hydrocarbon radical of an unmodified or modified resin acid, $R^*$[—COOM]$_k$—CO— is an acyl radical of a dimerized or trimerized fatty acid based on $C_{12}$-$C_{20}$-fatty acids, where $R^*$ is the hydrocarbon part of the acyl radical and k is accordingly either 1 or 2, and is in each case the cation $H^+$ alkali metal cation or one equivalent of an alkaline earth metal cation or ammonium or an ammonium ion which is substituted by at least one radical from the group consisting of $C_1$-$C_4$-alkyl and $C_1$-$C_4$-hydroxyalkyl, or an ammonium ion which is obtainable by addition of 1 to 150 mole equivalents of ethylene oxide or propylene oxide or of a mixture thereof onto ammonia or onto an amine corresponding to one of the aforementioned ammonium ions.

4. A compound as claimed in claim 1, which contains at least one radical —R'[X—O—)$_n$Z]$_p$ from the group consisting of the following structures:

—O—CO—$R^1$,

—O—$R^2$,

—$NR^3$—$R^2$,

—$NR^3$—CO—$R^1$,

—O—$CH_2$—[$CHOR^3$—]$_q$$CH_2$—O—CO—$R^1$,

—O—$CH_2$—[$CHOR^3$—]$_q$$CH_2$—O—$R^2$,

—O—$CH_2$—C[$CH_2OR^3$]$_2$—$CH_2$—O—CO—$R^1$,

—($NR^3$—$C_iH_{2i}$—)$_x$$NR^3$—$R^2$,

—$NR^3$—(X—O—)$_n$CO—$R^1$,

—O—CO—$R^*$[—CO(X—O—)$_n$Z]$_k$ and

—$OR^4$ where in the above formulae X, Z, n, $R^1$, $R^*$ and k have the abovementioned meanings and $R^2$ is a saturated or unsaturated, straight-chain or branched hydrocarbon radical of to 20 carbon atoms, $R^3$ is hydrogen, $C_1$-$C_4$-alkyl or a group of the formula (X—O)$_n$Z, where X, Z and n have the abovementioend meanings, $R^4$ is phenyl or naphthyl which are each unsubstituted or monosubstituted, disubstituted or trisubstituted by radicals from the group consisting of $C_1$-$C_{14}$-alkyl, q is from 1 to 4, r is from 1 to 6, and i is from 1 to 6.

5. A compound as claimed in claim 1, wherein Z comes from the group consisting of the following structures: H, —CO—CH=CH—COOM, —CO—$CH_2$—CH($SO_3M$)—COOM, —CO—$C_6H_4$—COOM, —CO—$C_6H_5$ and the acyl radical of dehydroabietic acid, at least one radical Z being different from H, and the radicals —R'[X—O—)$_n$Z]$_p$ being selected from the group consisting of the following structures:

—O—CO—R$^1$,

—O—R$^2$,

—NR$^3$—R$^2$,

—NR$^3$—CH$_2$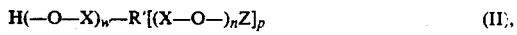CH$_2$—O—CO—R$^1$,

—CH$_2$—CH[O—(X—O—)$_n$Z]—CH$_2$—O—CO—R$^1$ and

—NR$^3$—CH$_2$CH$_2$CH$_2$—NR$^3$—R$^2$ where in the above formulae R$^1$, R$^2$, X and Z have the abovementioned meanings, and R$^3$ is hydrogen or (X—O—)$_n$Z, n is from 2 to 50, w is from 0 to 100, and M is a cation from the group consisting of H$^+$, an alkali metal cation, one equivalent of an alkaline earth metal cation, ammonium, and an ammonium group which is substituted by lower alkyl and is obtainable by addition of up to 100 mole equivalents of ethylene oxide or propylene oxide or a mixture thereof onto ammonia or lower alkylamines.

6. A process for preparing a compound of the general formula (I) as claimed in claim 1, which comprises esterifying hydroxynaphthalenecarboxylic acids of the formula HO-Ar-COOH by treatment with compounds of the formula (II)

$$H(—O—X)_w—R'[(X—O—)_nZ]_p \quad (II)$$

where Ar, X, R', Z, w, n and p have the meanings mentioned in the elucidation of the formula (I) and where preferably Z is hydrogen or p is 0, at the carboxyl group of the hydroxynaphthalenecarboxylic acids, alkoxylation the resulting esterification product without further or intermediary isolation, with ethylene oxide or propylene oxide or a mixture thereof to introduce polyglycol ether chains at the hydroxyl groups which are bonded to naphthalene nuclei and possibly at any further hydroxyl groups present or at amino groups derived from the compound of the formula (II) which have reactive hydrogen, and finally leaving the terminal hydroxyl groups of the alkoxylate obtained unmodified or reacting some or all of them with acids of the formula Z—OH, where Z is as defined above, or with reactive derivatives thereof in one or more stages.

7. The process as claimed in claim 6, wherein the further modification on the terminal hydroxyl groups of the polyglycol ether chains by nonionic or cationic acyl radicals Z is effected by esterification of the parent alkoxylated hydroxynaphthalenecarboxylic esters.

8. The process as claimed in claim 6, wherein the further modification of the terminal hydroxyl groups on the polyglycol ether chains by anionic acyl radicals Z is effected by reacting the parent alkoxylated hydroxynaphthalenecarboxylic esters, or alkoxylated hydroxynaphthalenecarboxylic esters already partially esterified by nonionic or cationic acyl radicals Z, provided the latter still have free hydroxyl groups, with compounds donating the sulfato radical.

9. The process as claimed in claim 6, wherein the further modification of the terminal hydroxyl groups on the polyglycol ether chains by anionic acyl radicals Z is effected by reacting the parent alkoxylated hydroxynaphthalenecarboxylic esters, or alkoxylated hydroxynaphthalenecarboxylic esters already partially esterified by nonionic or cationic acyl radicals Z, resins, provided the latter still have free hydroxyl, with dicarboxylic acids or polycarboxylic acids or anhydrides to give the corresponding monoesters.

10. The process as claimed in claim 9, wherein in the case of maleic monoester groups introduced as anionic acyl radicals Z into the alkoxylated hydroxynaphthalenecarboxylic esters the maleic monoester groups are subsequently converted by reaction with sulfites or bisulfites into the corresponding sulfosuccinic monoesters.

11. The compound as claimed in claim 3, wherein said R$^1$ is a straight-chain, saturated or unsaturated C$_7$–C$_{19}$-alkyl radical or a fatty or hydroxy-fatty acid of 8 to 20 carbon atoms, or is a radical or a resin acid selected from the group consisting of abietic acid, dehydroabietic acid, tetrahydroabietic acid, levopimaric acid, dextropimaric acid and isodextropimaric acid or of disproportionated dehydrogenated and dimerized natural resin acids.

12. The compound as claimed in claim 4, wherein said R$^2$ is a straight-chain, saturated or unsaturated C$_8$–C$_{20}$-alkyl radical based on a fatty alcohol, q is 1, r is 1 or 2, and i is 3.

13. The compound as claimed in claim 5, wherein said n is from 2 to 20, and w is from 1 to 50.

14. The compound as claimed in claim 1, wherein said total number of (n+w) of all alkyleneoxy units is from 6 to 150.

15. A method for modifying the surface tension of an aqueous medium comprising the step of introducing into the aqueous medium a compound of claim 1.

16. A method for dispersing or emulsifying or providing flotation of a material comprising the step of dispersing or emulsifying the material or providing flotation effects with a dispersant, emulsifier, coupling aid, formulation aid, flotation aid, drycleaning booster, or leveling or dyeing assistant comprising a compound of claim 1.

17. A dispersion of pigment, dye, or fluorescent whitening agent comprising the pigment, dye or fluorescent whitening agent and, as a dispersing agent therefor, a compound of claim 1.

* * * * *

UNITED STATES PATENT AND TRADEMARK OFFICE
CERTIFICATE OF CORRECTION

PATENT NO. : 5,194,665
DATED : March 16, 1993
INVENTOR(S) : Uhrig et al

It is certified that error appears in the above-indentified patent and that said Letters Patent is hereby corrected as shown below:

In claim 3, col. 22, line 14, insert --M-- before the phrase "is in each case".

In claim 3, col. 22, line 15, insert the phrase --or an-- prior to the phrase "alkali metal".

In claim 4, col. 22, line 52, insert --1-- prior to "to 20".

Signed and Sealed this

Twenty-eighth Day of December, 1993

Attest:

BRUCE LEHMAN

Attesting Officer

Commissioner of Patents and Trademarks